United States Patent Office 3,333,423
Patented Aug. 1, 1967

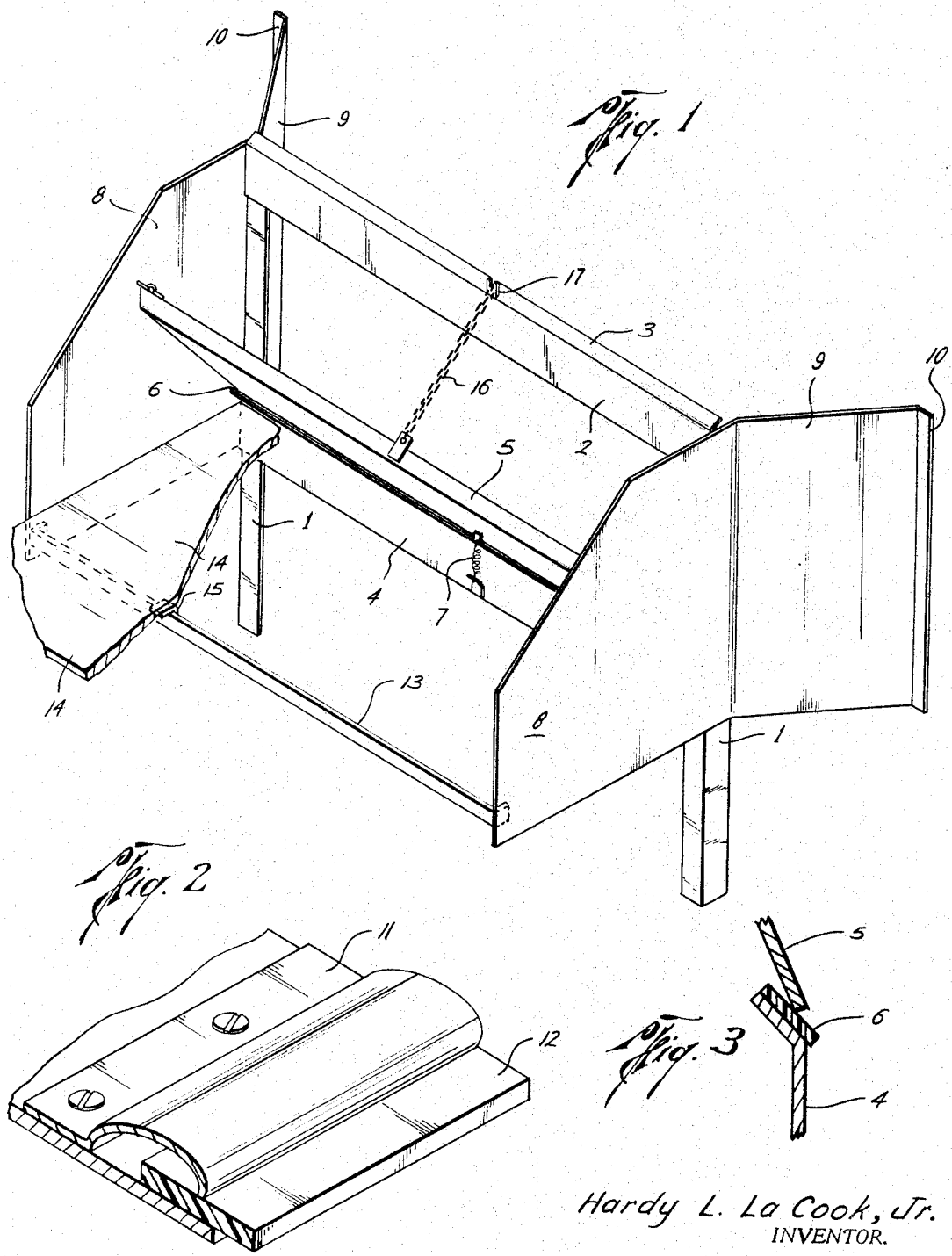

3,333,423
ADJUSTABLE WIER GATE
Hardy L. La Cook, Jr., 3804 Swarthmore,
Houston, Tex. 77005
Filed Aug. 30, 1965, Ser. No. 483,651
5 Claims. (Cl. 61—25)

This invention relates to new and useful improvements in an adjustable wier gate.

It is an object of this invention to provide a gate to be mounted in the banks of rice field irrigation ditches, or in the dikes around the fields, for controlling the flow of water from the fields to maintain a preselected water level in the fields.

In many irrigation projects, such as rice farming, it is desirable to place openings in the dikes at preselected positions, to control the flooding and drainage of the fields. It is important that a preselected level of water be maintained in the rice fields. The fields are ordinarily separated by dikes, and contoured to provide a gradually reduced elevation between the fields. Due to the shifting of locations of the dikes and the necessity of varying the position of the gates, a temporary gate is most practical. The difficulty with most temporary gates in common use for the above purpose is the tendency towards percolation of the water beneath the gate and the erosion of the soil around the gate. It is an object of this invention to provide a gate that may be quickly and easily installed in a temporary location, with sufficient penetration of the walls of the gate into the soil of the dike to guard against percolation, and having means for guarding the approaches to the gate against erosion and that may be selectively adjusted to maintain a preselected water level. It is important to control the water level in the field, so that in the event of heavy rainfall, the water will flow through the gates rather than wash out the dikes. In this instance the gates will maintain the water level, the lowermost dikes having gates emptying into drainage ditches.

With the above and other objects in view, the invention has relation to certain novel features of construction, operation and arrangement of parts more particularly defined in the following specifications and illustrated in the accompanying drawings, wherein:

FIGURE 1 is a perspective elevational view, showing the gate in partially open position.

FIGURE 2 is a fragmentary plan view of the gate sealing means between the gate and the side members thereof.

FIGURE 3 is a cross sectional end view of the gate supporting structure.

Referring now more particularly to the drawings, the numerals 1, 1 designate the legs formed preferably of angle iron, having the top bar 2, which has the rearwardly extending flange 3, and the similarly shaped lower bar 4, which supports the gate 5, the flange on the cross bar 4 extending forwardly of said legs and being inclined upwardly. Mounted on the flange on the bar 4 is a strip of yieldable material 6, such as neoprene, and the gate 5 bears against this strip of material, with the spring 7, which is anchored at one end to the bar 4 and at the other end to the gate 5, maintaining the gate in close relation with the strip 6.

Side members 8, 8 extend forwardly from the legs 1, 1 and wing members 9, 9, integral with the side members 8, 8, extending outwardly and rearwardly from the legs 1, 1, and are flanged, as 10, on the extended ends, so that they may be joined with additional gates to form a bank of gates, if desired.

The side margins of the gate 5 are provided with longitudinal clamps 11, for holding strips of flexible material, such as neoprene, 12, to seal off the areas between the side margins of the gate and the side members 8, 8.

The outwardly extended ends of the side members 8, 8 are joined by the cross bar 13. A splash sheet 14 rests on this bar 13 and the rear end of the splash sheet 14 abuts against the cross bar 4. Suitable stops, as 15, 15, secured to the bottom of the splash sheet 14, prevent forward movement of the splash sheet as water flows thereover. A chain 16 is secured to the top of the gate 5 and a chain link receiving member 17 is mounted in the top of the cross bar 3, which permits the chain to be locked on the bar 3 at any link in its structure, thus determining the level of the top of the gate with reference to the water level in the irrigation ditch.

In use, the dike, or bank, of an irrigation ditch, is breached and the depending portion of the legs 1, 1 are forced down into the soil, and the bottom margin of the side members 8, 8 and wings 9, 9 and cross bar 4 are embedded in the earth to a depth that will permit the top surface of the cross bar 13 to be level with the ground surface, as shown in dotted lines in FIGURE 1. The wings 9 will prevent erosion of the banks of the dike and the embedded portion of the side members, wings and cross bar 4 will prevent percolation of water from beneath the gate. The flanges 10, 10 on the wings 9, 9 may be employed to interlock with adjoining flanges on wings of adjoining gates of similar construction where banks of gates are desired.

When the gate 5 is closed, water will be maintained in the irrigation ditch or canal, and when flow through the gateway is desired, the distance of opening of the gate 5 is determined by the position of the chain 16 in the lock 17. Water will flow over the top of the gate 16, on to the splash sheet 14 and on to the field. When irrigation season is over, the entire device may be readily lifted out of the dike and stored for future use. When the neoprene, or other similar material, wears, or becomes hard due to weather conditions, the clamps 11 may be quickly and easily removed and the strips replaced.

While the foregoing is considered a preferred from of the invention, it is by way of illustration only, the broad principle of the invention being defined by the appended claims.

What I claim is:

1. In an adjustable wier gate, a pair of legs, cross bars mounted on said legs, side members on the upper portions of said legs extending forwardly thereof and wings mounted on said legs extending rearwardly and outwardly therefrom, a gate resting on one of said cross bars, means yieldingly maintaining said gate on said cross bar and means for varying the position of said gate.

2. In an adjustable wier gate, a pair of legs, cross bars mounted on said legs, side members on the upper portions of said legs extending forwardly thereof and wings mounted on said legs extending rearwardly and outwardly thereof, a strip of yieldable packing mounted on the upper end faces of one of said cross bars, a gate resting on said packing, and yieldable means for maintaining said gate on said packing.

3. In an adjustable wier gate, a pair of legs, cross bars mounted on said legs, side members on the upper portions of said legs extending forwardly thereof and wings mounted on said legs extending rearwardly and outwardly thereof, a strip of yieldable packing mounted on the upper end faces of one of said cross bars, a gate resting on said packing, yieldable means for maintaining said gate on said packing, strips of yieldable packaging mounted on the said gate and bearing against the said side members.

4. In an adjustable wier gate, a pair of angle irons forming legs, a cross bar joining the upper ends of said legs, the said cross bar having a flange on its upper longitudinal margin and said flange extending rearwardly, side members mounted on the upper portion of said legs, said side members extending forwardly and having integral wings extending rearwardly and outwardly from said legs, flanges on the extended ends of said wings for mating with abutting gates, a cross bar between said legs, the lower longitudinal margin of said last mentioned cross bar being on a horizontal plane with the horizontal plane of the lower longitudinal margins of said side members, the upper longitudinal margins of said last mentioned cross bar having a forwardly extending flange on which a strip of yieldable material is mounted, a gate closing the area between the said cross bars and resting on said yieldable material, means for yiedably maintaining said gate on said last mentioned cross bar and means for adjustably fixing the degree of opening of said gate.

5. The structure defined in claim 4 having a cross bar joining the extended ends of said side members adjacent the bottom thereof, and a splash sheet adapted to rest on said cross bar.

References Cited
UNITED STATES PATENTS

| | | | |
|---|---|---|---|
| 1,039,072 | 9/1912 | Edge | 61—25 |
| 1,206,938 | 12/1916 | Stimmel | 61—29 |
| 1,901,956 | 3/1933 | Gilbert | 61—29 |
| 3,091,034 | 6/1963 | Jacobs | 61—29 |

REINALDO P. MACHADO, *Primary Examiner.*